Feb. 15, 1938.    P. B. PARKS ET AL    2,108,507
CORRELATIVE TEMPERATURE CONTROL SYSTEM
Filed Sept. 18, 1936    3 Sheets-Sheet 3
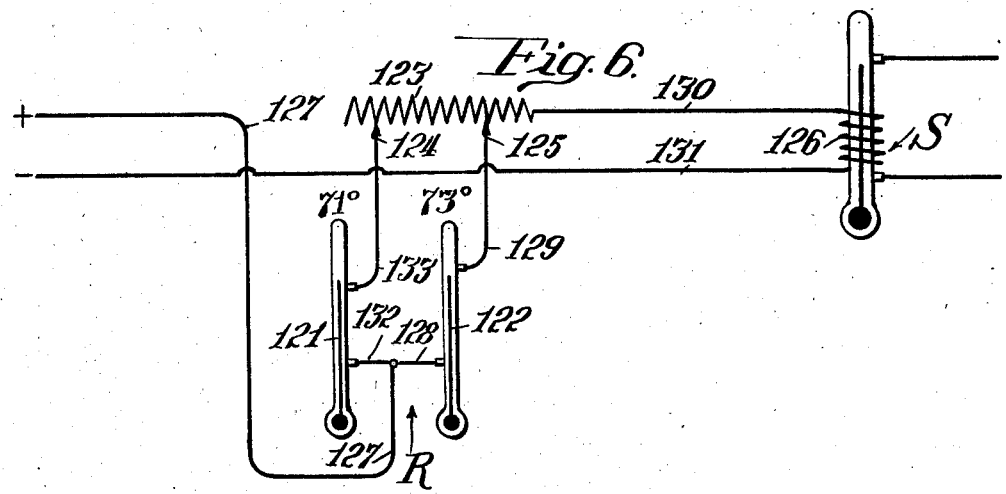
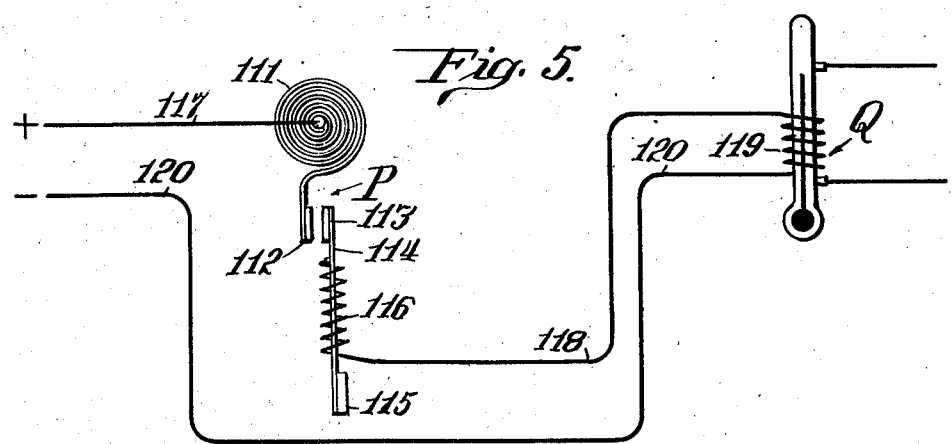
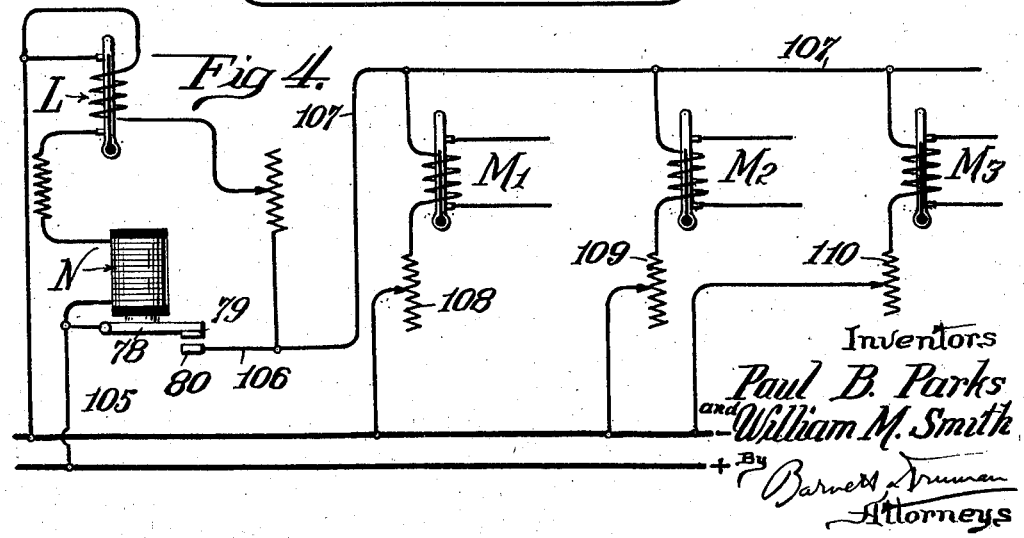
Inventors
Paul B. Parks
and William M. Smith
By Barrett Truman
Attorneys Patented Feb. 15, 1938

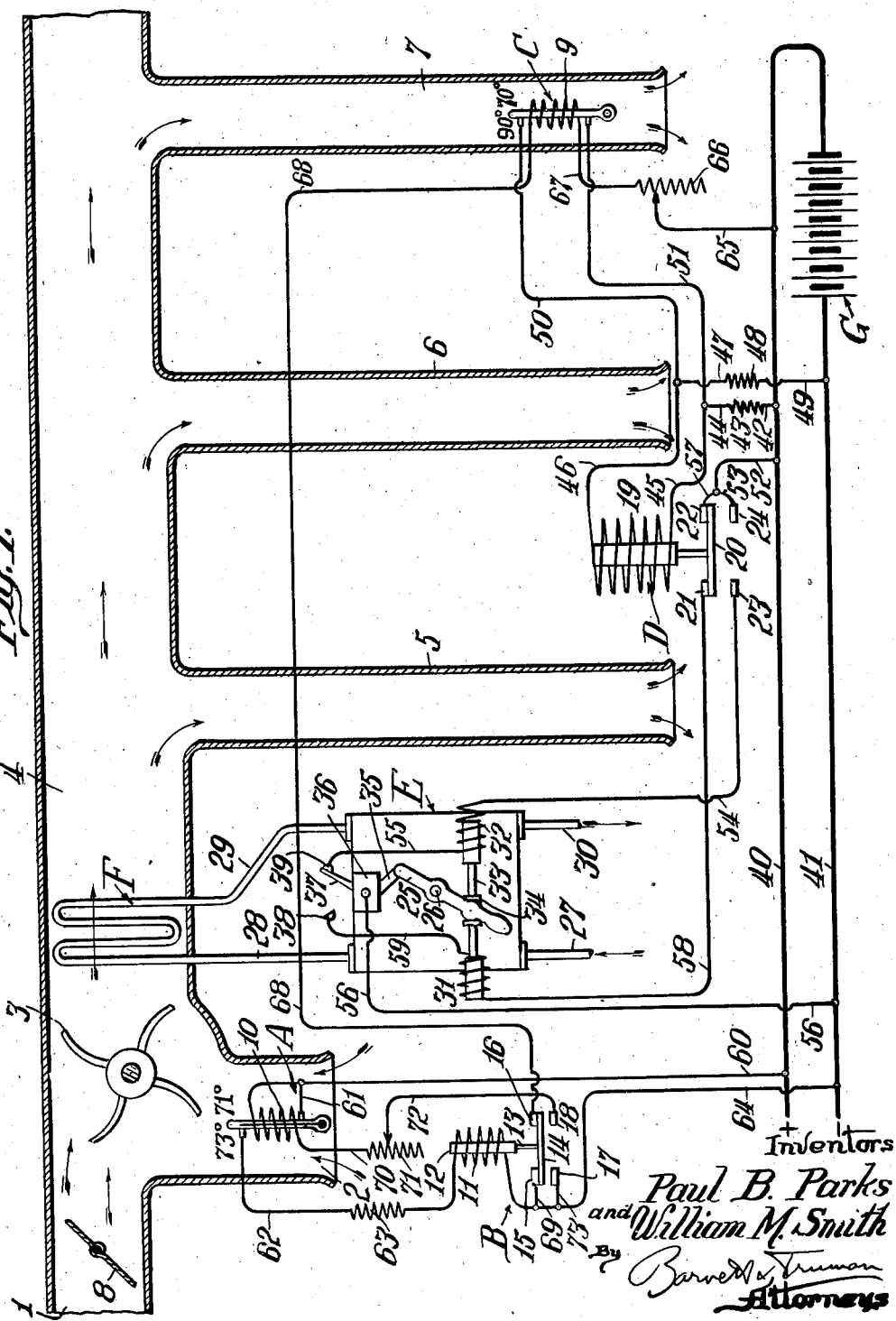

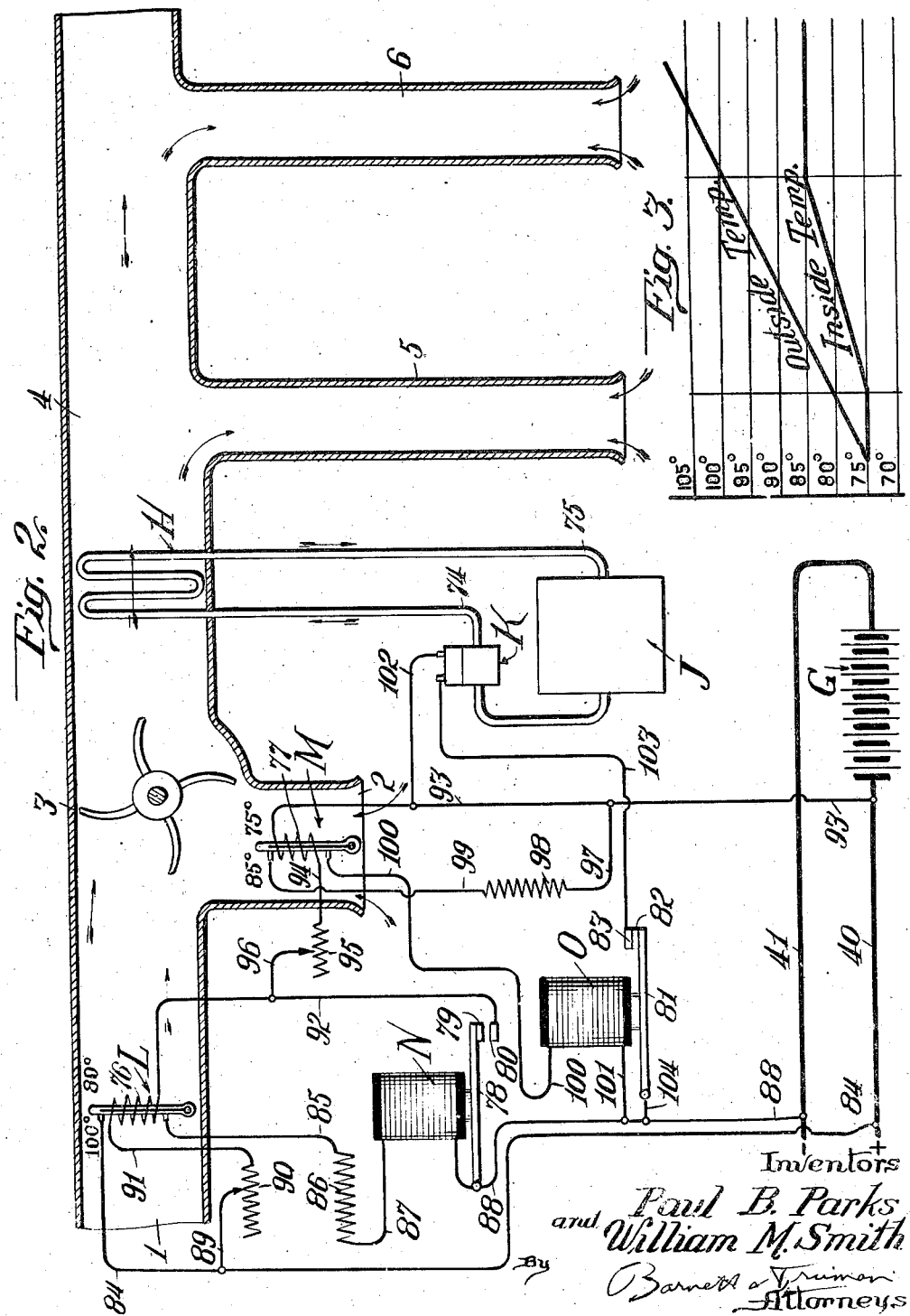

2,108,507

UNITED STATES PATENT OFFICE 2,108,507

CORRELATIVE TEMPERATURE CONTROL SYSTEM

Paul B. Parks, Oak Park, and William M. Smith, Chicago, Ill., assignors to Vapor Car Heating Company, Inc., Chicago, Ill., a corporation of New York Application September 18, 1936, Serial No. 101,462

6 Claims. (Cl. 236—68)

This invention relates to certain new and useful improvements in a correlative temperature control system, more particularly to an improved thermostatically operated system for selecting and maintaining temperatures in a given space in accordance with temperature changes at another location.

Briefly described, the invention provides means for creating a more or less constant temperature correction for one or more thermostats in either a heating system or a cooling system by adjusting the point of contact at which these thermostats function in accordance with the demand upon the system as directed by a master thermostatic control device which is self-actuated to make and break an electric control system in determined cycles, depending upon the temperature of the air to which the master thermostatic control element is subjected. More specifically, each thermostat is individually adjusted to function to close a circuit at a certain predetermined temperature, and the thermostat is provided with an electric heating element adapted to supply additional heat to the thermostat so as to lower the temperature at which the thermostat functions. The heating element of the master thermostat is so controlled that it will be energized whenever the contacts of the thermostat are open, and will be deenergized whenever the contacts are closed, and as a result the actual temperature to which the master thermostat responds will fluctuate intermittently so as to cause a more or less rapid opening and closing of the thermostat contact. The rapidity of the sequence with which this circuit through the master thermostat is made and broken will depend upon the temperature to which the thermostat is subjected. The control circuit that is made and broken by the master thermostat affects a relay which in turn controls the heating circuit for the control thermostat and determines the proportionate time during which the heating element of the control thermostat is energized, thus in turn determining the exact temperature at which the control thermostat will function to control the heating or cooling system as the case may be.

The principal object of this invention is to provide an improved thermostatic control system of the type briefly described hereinabove and disclosed more in detail in the specifications which follow.

Another object is to provide a master thermostatic control device adapted to determine the temperatures at which one or a plurality of separate temperature controlling devices will function.

Another object is to provide a thermostatic control system such that the temperature maintained in one or a plurality of separate spaces will be determined by the temperature then prevailing at another predetermined location.

Another object is to provide an improved heating system comprising two balanced thermostatic controls so cooperating that both the temperature within the space to be heated and the temperature within the supply duct through which heated air is delivered into the space will be maintained within certain different but predetermined limits.

Another object is to provide an improved cooling system in which the temperature within the space being refrigerated will, within certain limits, be so controlled as to maintain a predetermined but varying differential between the temperature within the space and the outside temperature then prevailing.

Other objects and advantages of this invention will be more apparent from the following detailed description of certain forms of apparatus, and the methods of operating same, as will all be more apparent from the following detail disclosures.

In the accompanying drawings:

Fig. 1 is a diagrammatic showing of a heating system and the electrical control system therefor, illustrating the application of the principles of this invention.

Fig. 2 is a similar diagrammatic disclosure of a refrigerating system, illustrating another adaptation of the invention.

Fig. 3 is a chart illustrating the temperatures maintained by the cooling system shown in Fig. 2.

Fig. 4 is a wiring diagram illustrating the method of controlling a plurality of individual control thermostats from a single master thermostat.

Figs. 5 and 6 are partial wiring diagrams illustrating two possible modifications of the master thermostatic control.

Referring first to Fig. 1, a hot air heating system is disclosed in which a mixture of outside air drawn in through inlet 1 and return air drawn in through inlet 2 is forced by blower 3 past a radiator or other heating element F positioned in the main conduit 4 from which extend separate delivery ducts 5, 6 and 7 through which the heated air is delivered into the space being heated. It is desirable that a certain temperature, for example approximately 71° Fahrenheit, be maintained in the space to be heated, and at the same time it is desirable that some maximum temperature such as 90° Fahrenheit shall not be exceeded at any time in the delivery ducts. The system comprises the master thermostatic device A which through relay B regulates the adjustment of the control thermostat C, which in turn through relay D controls the valve E which determines the flow of heating medium to the heating device F. In this example the master thermostatic control device A responds to temperature changes within the space being heated and is preferably positioned within the inlet duct 2 through which air from the space is returned into the heating duct system. The control thermostat C is positioned within one of the delivery ducts, for example the duct 7 as here shown.

Preferably a control valve 8 is positioned within the inlet 1 so as to determine the percentage of fresh outside air that is drawn into the system. For example, about 20% outside air may be used.

The thermostats A and C may be of the same general type, and are preferably of the type disclosed and claimed in the patent to Parks and Miller, No. 2,046,578, granted July 7, 1936. The thermostat is of the thermometer type, the stem of the thermometer being provided with two spaced apart electric contacts, one of which is in constant engagement with the mercury column and the other of which is positioned higher in the stem so as to be engaged by the mercury column when the thermometer responds to some predetermined maximum temperature. In this manner an electric circuit will be completed through the mercury column. A heating coil or other heating element is associated with the thermometer so as to add a predetermined amount of additional heat thereto when the coil is energized. In this manner the temperature at which the circuit will be completed through the thermostat is lowered a predetermined amount. In the present example the thermostat C is so constructed as to close its circuit at a temperature of 90° Fahrenheit, when the heating coil 9 is not energized. When the heater 9 is continuously energized, the temperature at which thermostat C will function is reduced 20°, that is the circuit therethrough will be closed at 70° Fahrenheit. In the present example the thermostat A is designed to normally function at 73° Fahrenheit, but when heating coil 10 is energized the thermostat will function at 71°, that is the heater will lower the operating temperature 2°. The thermostats are so designed on the assumption that it is desirable to maintain a temperature in the space being heated that will be somewhere between 71° and 73°, and that the temperature in the delivery duct for the heated air should never be permitted to exceed 90° Fahrenheit. Actually, as will be hereinafter apparent, the temperature of the heated air in the duct will be established somewhere between 70° and 90° Fahrenheit, as outside temperature conditions may determine. It will be evident that the temperature of the air in the delivery duct will depend upon (1) the temperature of the air returned through conduit 2, which is determined by the temperature already established in the space being heated, (2) the temperature of the outside air drawn in through conduit 1, and (3) the amount of heat imparted to the air by the heater F. It is apparent that factors (1) and (2) will vary, but the desired inside temperature may be maintained substantially constant by making suitable changes in factor (3), and the present system operates to so control the source of heat as to bring about this desired result.

The relay B comprises a magnetic coil 11 which when energized will draw up core 12 which through stem 13 lifts movable contact plate 14 into engagement with the pair of fixed contacts 15 and 16. When the magnetic coil is deenergized contact 14 will drop into engagement with a second pair of fixed contacts 17 and 18. Relay D may be similar in all respects to the relay B and comprises a magnetic coil 19 adapted when energized to lift contact 20 into engagement with the fixed contacts 21 and 22. When the magnet is deenergized contact 20 will bridge a second pair of fixed contacts 23 and 24.

The valve E is of an electrically actuated type well known in the art and comprises an operating lever 25 centrally pivoted at 26 and adapted to oscillate through a small arc a valve member positioned within the valve casing. As shown in the drawing this valve is in the "open" position and at this time steam from the source of supply will flow in through supply pipe 27 to valve E, thence through pipe 28 to the heater F, thence back through pipe 29 to the valve and out through return pipe 30. When lever 24 is swung in a counterclockwise direction through a small arc to a correspondingly inclined position at the other side of the vertical, the valve will be closed and steam will flow from pipe 27 through the valve and out through pipe 30 without passing to and through the heater F. Valve-operating lever 25 is moved by a pair of solenoid motors 31 and 32, the cores of which are connected by a stem 33 having a yoke 34 engaging about one end portion of lever 25. As shown in the drawings, the solenoid coil 31 has been last energized and has drawn in its core so as to shift the stem 33 toward the left and move the valve to the open position. When coil 32 is energized the stem 33 will be shifted in the opposite direction and the valve moved to closed position. The opposite end of lever 25 is connected through lever 35 with a snap switch 36 having a movable contact arm 37 adapted to engage alternately with a pair of fixed contacts 38 and 39. At the completion of the valve movement to open position, as now shown, arm 37 will snap from engagement with fixed contact 38 into engagement with fixed contact 39. Conversely, when the valve is moved to closed position arm 37 will be snapped over into engagement with the other fixed contact 38.

At G is indicated a suitable source of electric power, for example a battery, from the opposite terminals of which extend the positive main 40 and negative main 41. The relay D will normally be energized over the following circuit: From positive main 40 through wire 42, resistance 43, wires 44 and 45, relay coil 19, wires 46 and 47, resistance 48 and wire 49 to the negative main 41. When the desired maximum temperature is reached in delivery duct 7, a circuit short-circuiting the coil 19 will be completed as follows: From one terminal of coil 19 through wire 50, mercury column of thermostat C, and wire 51 to the other terminal of the relay coil. This will deenergize the relay so that the movable contact 20 will drop into engagement with the pair of fixed contacts 23 and 24 and thus complete the following valve-operating circuit: from the positive main through wires 52 and 53, relay contacts 24, 20 and 23, wire 54, solenoid coil 32, wire 55, snap switch contacts 39 and 37, and wire 56 to the negative main. Solenoid 32 will then draw in its core and shift the valve to the closed position thus cutting off the further flow of heating medium to the heater F. At the completion of this valve-operating movement the snap switch contact 37 will be shifted over into engagement with fixed contact 38. When the temperature has fallen in duct 7 sufficiently to break the circuit through thermostat C, the relay D will again be energized and will draw up contact 20 into engagement with fixed contacts 21 and 22, as shown in the drawings. This will complete a second valve operating circuit as follows: from the positive main through wires 52 and 57, relay contacts 22, 20 and 21, wire 58, solenoid coil 31, wire 59, snap switch contacts 38 and 37, and wire 56 to the negative main. This will shift the valve back to the open position shown in the drawings. When master thermostat A is exposed to a certain predetermined maximum temperature, for example 71°, a circuit energizing the relay B will be completed as follows: from positive main through wires 60 and 61, thermostat A, wire 62, resistance 63, relay coil 11, and wire 64 to the negative main. This will cause movable contact 14 of the relay to be drawn up so as to complete a circuit energizing the heating coil 9 of thermostat C as follows: from the positive main through wire 65, adjustable resistance 66, wire 67, heating coil 9, wire 68, relay contacts 16, 14 and 15, and wires 69 and 64 to the negative main. When the circuit through thermostat A is broken by the lowering of the mercury column, relay B will be deenergized and the contact 14 will move down into engagement with the fixed contacts 17 and 18. This will complete a circuit energizing the heating coil 10 of master thermostat A as follows: from the positive main through wire 60, heating coil 10, wire 70, adjustable resistance 71, wire 72, relay contacts 18, 14 and 17, and wires 73 and 64 to the negative main. It will be noted that this movement of relay B will break the circuit energizing the heating coil of thermostat C, that is when the electric heater for thermostat A is energized the heater for thermostat C will be deenergized and vice versa.

Assuming now that the heating system is first being put into operation after a period of disuse, the temperature in the space to be heated may be considerably below the desired temperature, for example 60° Fahrenheit. Consequently the mercury column of thermostat A will be out of contact with the upper fixed contact and relay B will be deenergized. It follows that the heating coil 10 will be energized so that thermostat A will function to close the relay-energizing circuit at 71°. At this time the energizing circuit for heater 9 of thermostat C will be broken so that thermostat C will not function until a temperature of 90° is reached in the delivery duct 7. Valve E will be moved to open position and heating radiator F will function until the heated air streams delivered into the compartment or space reach a temperature of 90° Fahrenheit, at which time thermostat C will function to cause valve E to close. However, as soon as the temperature of the heated air falls below 90° the valve will be again opened so that the heated air streams delivered into the compartment will be kept at approximately 90°, but no higher, until a temperature of 71° has been produced in the space being heated. When the air withdrawn from the space through return conduit 2 reaches this temperature of 71°, thermostat A will function to energize relay B, and as a consequence the energizing circuit for heater 10 of thermostat A will be broken, and heater 9 of thermostat C will now be energized. Since master thermostat A now functions at 73° (since the additional heat from heater 10 has been removed) and the temperature of the return air passing over this thermostat is only about 71°, the mercury column will fall rather rapidly thus breaking the energizing circuit for relay B, thus reestablishing the heating circuit through heater 10 of thermostat A and again breaking the heating circuit for heater 9 of thermostat C. The additional heat provided by heater 10 will soon cause thermostat A to again close the energizing circuit for relay B, and this cycle of events will repeat itself continuously so as to send a succession of intermittent heating impulses to the heater 9 of the control thermostat C.

It will be apparent that if heater 9 is continuously energized the thermostat C will function to open and close the valve E so as to maintain a maximum temperature of 70° in the delivery duct. On the other hand, if heater 9 is continuously deenergized a maximum temperature of 90° will be maintained in the duct. With the heater 9 energized intermittently, some intermediate temperature, between 70° and 90°, will be established in the heat delivery ducts, just sufficient to maintain approximately the desired temperature in the space to be heated. It will be apparent that once approximately the desired temperature has been established in this space, the necessary temperature of the heated air streams delivered through ducts 5, 6 and 7 will depend largely upon the outside temperature then prevailing which affects the system through the stream of cold air drawn in through inlet 1 into the duct system. Other conditions remaining approximately constant, a higher temperature of heated air delivered to the space will be required when the outside temperature is lower, and vice versa. After a few cycles of operation, the thermostatic system will tend to strike a balance so that the temperature of the heated air streams delivered through ducts 5, 6 and 7 will be maintained at some approximately constant temperature, for example about 80° Fahrenheit. This temperature will of course depend upon the amount of heat necessary to maintain the desired inside temperature, and this amount will be less in warm weather than in cold weather and vice versa. At no time is the temperature of the air delivered into the space permitted to become undesirably hot, that is in the present example it is never permitted to exceed 90° Fahrenheit.

Referring now to Figs. 2 and 3, an example of how this improved temperature control system could be applied to a refrigerating system will be described. As in the heating system previously described, outside air is drawn in through inlet duct 1 and return air through inlet duct 2, this mixture of air being forced by blower 3 into supply duct 4 in which is positioned a refrigerating element H, the cooled air being delivered through ducts 5 and 6 into the space to be refrigerated. The continuously operating refrigerating system indicated diagrammatically at J is adapted to supply refrigerating medium through pipe 74 to the cooling coil H, this medium with its absorbed heat being returned through pipe 75 to the refrigerating system J. The electrically actuated cut-off valve K positioned in supply pipe 14 determines the flow of refrigerating medium to the cooler H.

The master thermostatic control device L is positioned in the outside air inlet duct 1, whereas the control thermostat M for determining the temperature to be maintained within the refrigerated space is positioned within the return air inlet 2. These thermostats L and M may be substantially of the same type already described in connection with the heating system. In the present example the master thermostat L is assumed to function to close a circuit therethrough when a maximum temperature of 100° is reached, but when the heating coil 76 of this thermostat is energized the thermostat will function at 80°. Control thermostat M is designed to close its circuit at 85°, but this temperature is lowered to 75° when the heater 77 of this thermostat is energized.

The relay N, which is controlled by master control thermostat L, is adapted when energized to draw up the armature 78 so as to separate the electrical contacts 79 and 80. The similar relay O, controlled by thermostat M, is adapted when energized to draw up the armature 81 so as to close a circuit between contacts 82 and 83. When relay O is deenergized these contacts 82 and 83 will be separated.

As before, the battery G supplies electric current to the positive and negative mains 40 and 41 respectively. Assuming that the temperature of the outside air is below 80° Fahrenheit, the master thermostat L will not function to complete a circuit therethrough even though the heating coil 76 of this thermostat is energized. Assuming that the temperature of the outside air exceeds 80°, the mercury column of thermostat L will rise sufficiently to engage the upper contact and a circuit through this thermostat will be completed as follows: from positive main 40 through wire 84, thermostat L, wire 85, resistance 86, wire 87, relay N, and wire 88 to the negative main. The relay N will now function to raise the armature 78 and break the previously closed energizing circuit for heater 76 of thermostat L which is as follows: from the positive main through wires 84 and 89, adjustable resistance 90, wire 91, heating element 76, wire 92, relay contacts 80 and 79, armature 78, and wire 88 to the negative main. As soon as this last mentioned circuit is broken, the additional heat will no longer be supplied by heater 76 so that thermostat L will not function until a temperature of 100° is reached. If the outside temperature is only a few degrees above 80°, the mercury column will drop rapidly and the energizing circuit through this thermostat for relay N will be broken so that armature 78 will be released and the heating circuit for heater 76 will again be completed and the mercury column will again rise to close the relay circuit. This cycle of events will repeat itself continuously, the rapidity of the successive operations depending upon the outside temperature prevailing at any given time as will be hereinafter apparent.

As long as relay N is deenergized, an energizing circuit for heater 77 of thermostat M will be completed as follows: from the positive main through wire 93, heater coil 77, wire 94, adjustable resistance 95, wire 96, wire 92, relay contacts 80 and 79, armature 78, and wire 88 to the negative main. As long as heating coil 77 is energized, thermostat M will function to close a circuit therethrough at a temperature of 75° Fahrenheit.

This circuit is as follows: from the positive main through wires 93 and 97, resistance 98, wire 99, thermostat M, wire 100, relay O, and wires 101 and 88 to the negative main. When relay O is energized a circuit for opening the valve K will be completed as follows: from the positive main through wires 93 and 102, valve K, wire 103, thermostat contacts 83 and 82, armature 81, and wires 104 and 88 to the negative main. That is, when a temperature of 75° is exceeded in the space that is being cooled, valve K will be opened so as to permit the flow of refrigerating medium to the radiator H so that cooled air will be forced through the delivery ducts 5 and 6 into the space. If the heater 77 is not energized, the refrigerating system will function in the same manner but will not be put into operation until a temperature of 85° is reached within the space. It will be apparent that this inside temperature may be established at some point between 75° and 85° by intermittently energizing the heating element 77 which supplies additional heat to thermostat M, and this intermittent operation is accomplished by relay N, which in turn is controlled by the master thermostat L.

It is undesirable, within certain limits, to permit too great a difference to exist between the temperature maintained within the space and the outside temperature. It is uncomfortable for persons entering or leaving the space to encounter too great a temperature change, and for this reason, between certain temperature limits, the temperature within the space is permitted to rise as the temperature rises outside the space but not to as great an extent. Referring to the chart shown in Fig. 3, as long as the outside temperature is below 80° Fahrenheit, an inside temperature of 75° Fahrenheit will be maintained. As the outside temperature rises above 80° Fahrenheit the inside temperature is permitted to rise slowly so that at an outside temperature of 100° Fahrenheit the inside temperature will be maintained at 85°, but no higher. It is assumed that an inside temperature above 85° would be undesirable, so the temperature is held at 85° inside no matter how much above 100° the outside temperature rises.

Referring again now to Fig. 2, it will be noted that as long as the outside temperature remains below 80° the thermostat L will never function to complete the relay energizing circuit even though heater 76 is continuously energized. As a consequence the heater 77 of control thermostat M will remain continuously energized and this thermostat will function at 75° to successively open and close the valve K thus causing the refrigerating system to maintain an approximately constant temperature of 75° within the enclosure. On the other hand, assuming that the outside temperature remains above 100° the energizing circuit for relay N will remain continuously closed so that heater 77 of control thermostat M will be continuously deenergized and this thermostat will function continuously to maintain an inside temperature of 85°. At outside temperatures intermediate 80° and 100° the actuating circuit for relay N will be intermittently made and broken so as to cause intermittent heat impulses to be supplied by heater 77 of thermostat M so that this thermostat will function to establish an inside temperature somewhere between 75° and 85°. If the outside temperature is only slightly above 80°, the relay N will remain deenergized for the greater portion of the time and consequently the energizing circuit for heater 77 will remain closed for the greater portion of the time so that the inside temperature will not be permitted to rise much above 75°. On the other hand, if the outside temperature is only slightly below 100°, relay N will be energized for the greater portion of the time and the energizing circuit for heater 77 will only be closed for short and widely separated periods so that the inside temperature will not be lowered much below 85°. Tests have proven that between these limits the inside temperature will be permitted to rise directly in proportion to outside temperature changes but at a slower rate so as to maintain substantially the relative temperatures indicated graphically by the chart in Fig. 3.

While we have described the several thermostats A, C, L and M as having their lower limits of operations substantially fixed, it will be apparent that these lower operating temperatures can be changed by adjusting the resistances in the heater circuits. For example, referring to thermostat M in Fig. 2, by adjusting the resistance 95 the operating temperature of 75° may be raised or lowered as may be found desirable. By suitably adjusting the variable resistances of the master and control thermostats, a considerable range of relative temperatures can be maintained.

In any temperature controlling system of this type, whether for heating or cooling, it is possible to simultaneously adjust a plurality of control thermostats from a single master thermostat. For example, the simplified wiring diagram shown in Fig. 4 illustrates a refrigerating system involving a plurality of separate refrigerating units, the general plan of operation being much the same as already described in connection with Fig. 2. The master thermostat L and its relay N operate the same as in Fig. 2. At M1, M2 and M3 are indicated three independent control thermostats, each functioning the same as the thermostat M in Fig. 2. It is to be understood that there will be associated with each of these thermostats all of the elements of an independent refrigerating system such as shown as H, J, K and O in Fig. 2, together with the necessary wiring connections. Master thermostat L through relay N simultaneously determines the timing of the heating impulses applied to the electric heaters for each of the control thermostats M1, M2, and M3 (and as many more such thermostats as may be desired) through the following circuit: from the positive main through wire 105, armature 78, contacts 79 and 80, wires 106 and 107, and thence independently through each of the heating circuits arranged in parallel to the negative main. It will be apparent that the relative strength of the heating currents in each of these separate parallel circuits may be adjusted by means of the several variable resistances 108, 109 and 110 so that different selected temperatures may be maintained in each of the separate spaces controlled by the several independent refrigerating systems.

In Fig. 5 is illustrated a possible modification of the master thermostatic control device. The master thermostat or interrupter indicated generally at P controls the heating impulses delivered to the control thermostat Q. The coiled metallic thermostat 111 which may be of well known type, expands or contracts in response to changes in the temperature to which it is subjected so as to determine the positioning of the contact 112 carried by the free end of this thermostatic coil. A cooperating contact 113 is carried at the free or movable end of the bi-metallic thermostatic bar 114 which is anchored at its other end 115. A heating coil 116 is associated with the thermostatic bar 114 so as to cause this bar to warp when a current is passed through the coil 116. When contacts 112 and 113 are in engagement with one another, a heating circuit is completed as follows: from wire 117 through thermostat 111, contact 112, contact 113, bar 114, heating coil 116, wire 18, heating coil 119 of control thermostat Q and wire 120 back to the source of power. The current flowing through coil 116 will cause bar 114 to warp and break the circuit between contacts 112 and 113. Wire 114 will then cool off and return to its original position so as to again bring the contacts 112 and 113 into engagement thus again completing the heating circuit. It will thus be apparent that this heating circuit is alternately made and broken, and the timing of the heating impulses is determined by the position of the relatively fixed contact 112 which is in turn determined by the temperature to which master thermostatic coil 111 is subjected. This form of master thermostatic control may be used in circuits, for example, such as already described in connection with Figs. 1, 2 and 4.

In Fig. 6 is illustrated another example of such a master thermostatic control. The master thermostat indicated generally at R is adapted to control the adjustment of the control thermostat S. The similar mercury column thermostats indicated at 121 and 122 are adapted to respectively function at spaced apart temperatures such as 71° and 73°. The control resistor 123 is provided with a pair of separate adjustable contacts 124 and 125 whereby the proportionate amount of resistance 123 that is included in the heating circuit for heating coil 126 of thermostat S may be determined. Assuming that the temperature to which master thermostat R responds is above 73° Fahrenheit, the following circuit will be completed: from positive wire 127 through wire 128, thermostat 122, wire 129, adjustable contact 125, a relatively small proportion of resistance 123, wire 130, heating coil 126 of thermostat S, to negative wire 131. Under these conditions the heating coil 126 will be strongly energized so as to considerably lower the temperature at which thermostat S will function. If the temperature falls below 73° but not below 71°, the heating circuit will be as follows: from positive wire 127 through wire 132, thermostat 121, wire 133, adjustable contact 124, an increased amount of resistance 123, and thence as before through the heating coil 126. The increased resistance 123 in this heating circuit will decrease the current flowing through heating coil 126 and thus raise the temperature at which thermostat S will function. If the temperature at thermostat R should fall below 71°, the heating circuit will be entirely broken and thermostat S will function at a still higher temperature.

We claim:

1. In a temperature controlling system, a master thermostat positioned so as to respond to temperature changes at a selected location, an actuating circuit closed by said thermostat at a predetermined temperature, an electric heater positioned to apply additional heat to the thermostat so as to lower the temperature at which the thermostat will close the actuating circuit, an energizing circuit for the heater, a relay in the actuating circuit adapted to make and break the heater energizing circuit as the actuating circuit is opened and closed respectively, means for maintaining a selected temperature in a space, a thermostat responsive to temperature changes in this space for controlling the last-mentioned means, an electric heater for the control thermostat, and an energizing circuit for the last-mentioned electric heater, this energizing circuit being intermittently made and broken by the relay so as to determine the temperature at which the control thermostat will function.

2. In a temperature controlling system, a master thermostat positioned so as to respond to temperature changes at a selected location, an actuating circuit closed by said thermostat at a predetermined temperature, an electric heater positioned to apply additional heat to the thermostat so as to lower the temperature at which the thermostat will close the actuating circuit, an energizing circuit for the heater, a relay in the actuating circuit adapted to make and break the heater energizing circuit as the actuating circuit is opened and closed respectively, a plurality of means for respectively maintaining selected temperatures in each of a plurality of spaces, a plurality of thermostats respectively responsive to temperature changes in the several spaces, each thermostat controlling the temperature maintaining means for its respective space whereby different temperatures may be simultaneously maintained in the several spaces, an electric heater for each control thermostat, and energizing circuits for each of the last mentioned electric heaters, said energizing circuits being intermittently but simultaneously made and broken by the relay so as to determine the several temperatures at which the control thermostats will function.

3. In a heating system, a master thermostat positioned so as to respond to temperature changes in the space being heated, an actuating circuit closed by said thermostat at a predetermined temperature, an electric heater positioned to supply additional heat to the thermostat so as to lower the temperature at which the thermostat will close the actuating circuit, an energizing circuit for the heater, a relay in the actuating circuit adapted to make and break the heater energizing circuit as the actuating circuit is opened and closed respectively, means for delivering heated air into the space, means for heating this air, a thermostat responsive to temperature changes of this air and controlling the heating means, an electric heater for the control thermostat, and an energizing circuit for the last mentioned electric heater, this energizing circuit being closed by the relay as the first-mentioned heater circuit is broken, and broken as the first-mentioned heater circuit is closed.

4. In a system for cooling a space, a master thermostat positioned so as to be responsive to changes in temperature of the outside air, an actuating circuit closed by said thermostat at a predetermined temperature, an electric heater positioned to supply additional heat to the thermostat so as to lower the temperature at which the thermostat will close the actuating circuit, an energizing circuit for the heater, means for cooling the air within the space, a thermostat responsive to temperature changes within the space and controlling the cooling means, an electric heater for the control thermostat, an energizing circuit for the last mentioned electric heater, and a relay in the actuating circuit, said relay functioning to make and break the heater energizing circuits as the actuating circuit is opened and closed respectively.

5. In a temperature controlling system, in combination, a relay including a switch mechanism, an energizing circuit for the relay, a thermostat responsive to temperature changes at a certain location and adapted to close the relay energizing circuit at a predetermined maximum temperature, a heating element positioned adjacent the thermostat and adapted to impart additional heat thereto, an energizing circuit for the heating element, said latter circuit being closed by the switch mechanism when the relay is deenergized, and a temperature controlling mechanism for a space comprising a thermostat responsive to temperature changes within the space, a heating element adjacent this latter thermostat, and an energizing circuit for the latter heating element, said latter energizing circuit being intermittently opened and closed by the movements of the switch mechanism.

6. In a temperature controlling system, in combination, a thermostat responsive to temperature changes at a certain locality, a second thermostat responsive to temperature changes within a space, a pair of electric heating elements one positioned adjacent each of the thermostats and adapted to impart additional heat thereto, separate energizing circuits for the heating elements, a relay, an energizing circuit for the relay that is completed or broken as the temperature at the first mentioned thermostat rises to or falls below a predetermined maximum temperature, and switch mechanism operated by the relay for intermittently opening and closing the heater energizing circuits to impart heating impulses to the heating elements, said impulses being imparted to the first mentioned thermostat when the temperature prevailing at the location of that thermostat falls below a predetermined maximum and the duration of the heating impulses imparted to both thermostats varying in proportion to the variation of this prevailing temperature from the predetermined temperature.

PAUL B. PARKS.
WILLIAM M. SMITH.